S. C. MARTIN.
ADVERTISEMENT DEVICE.
APPLICATION FILED JUNE 5, 1914.
1,154,124.
Patented Sept. 21, 1915.
4 SHEETS—SHEET 1.
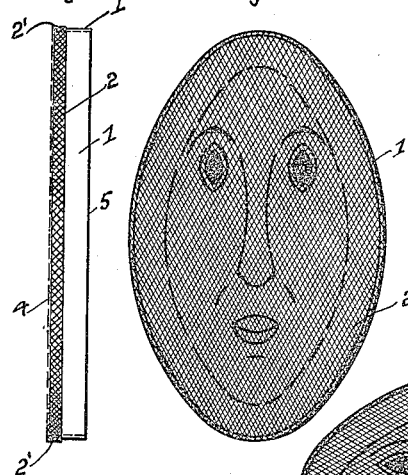
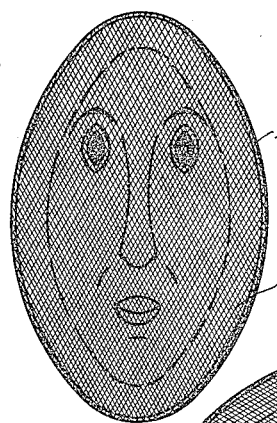
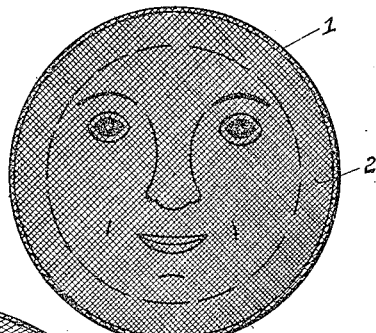
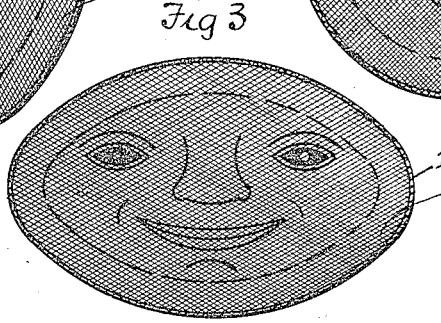
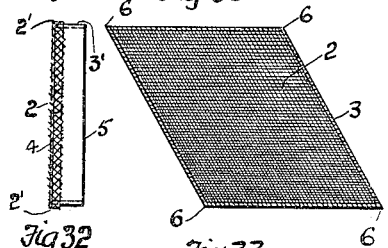
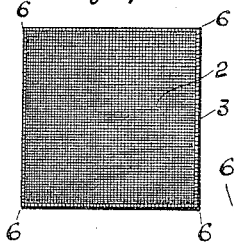
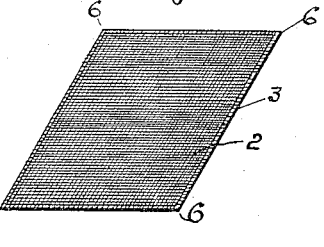
WITNESSES:
John C. Sanders
Albert F. Heuman
INVENTOR
Sidney Charles Martin
BY Wallace White
ATT'Y

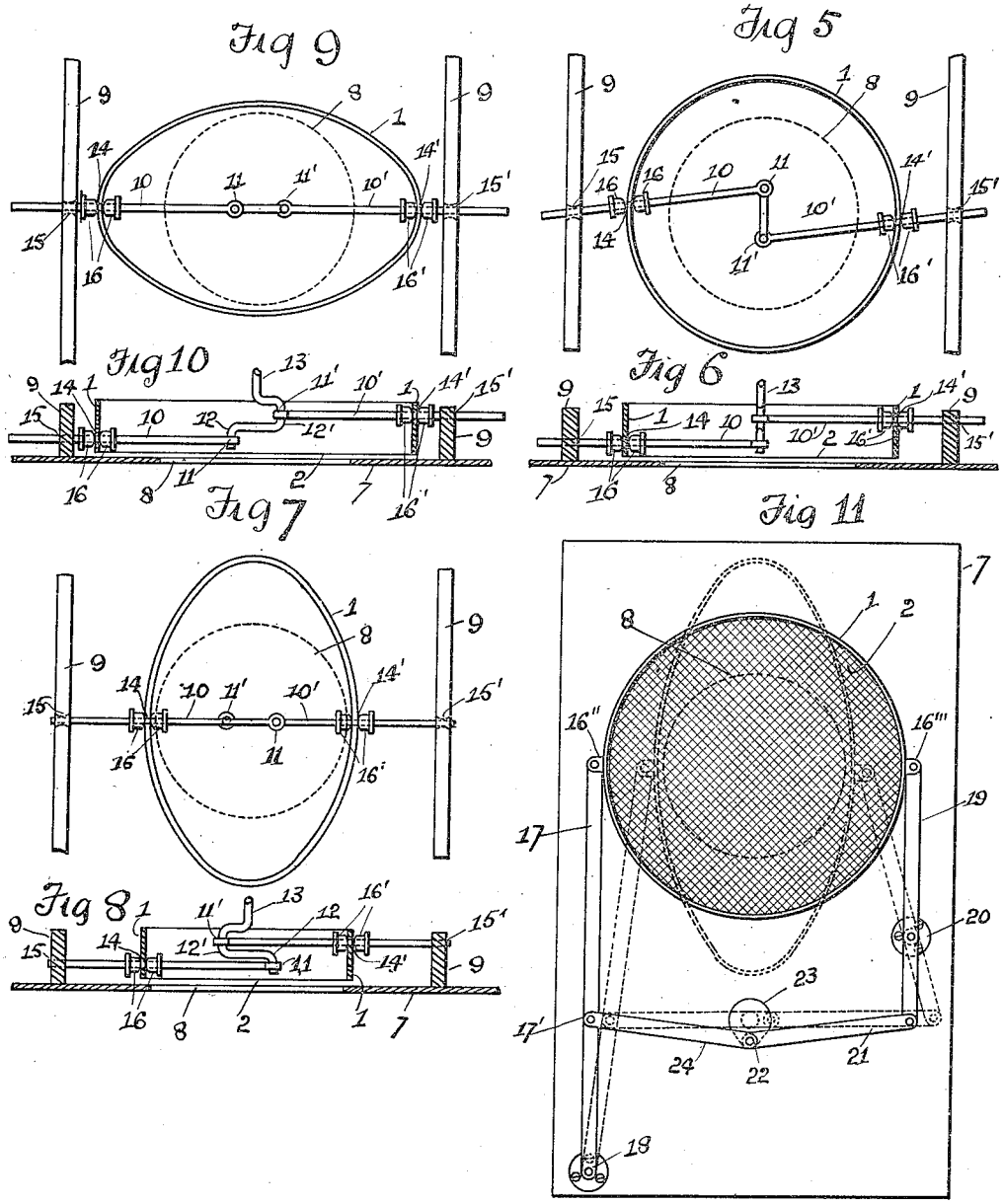

S. C. MARTIN.
ADVERTISEMENT DEVICE.
APPLICATION FILED JUNE 5, 1914.
1,154,124.
Patented Sept. 21, 1915.
4 SHEETS—SHEET 3.
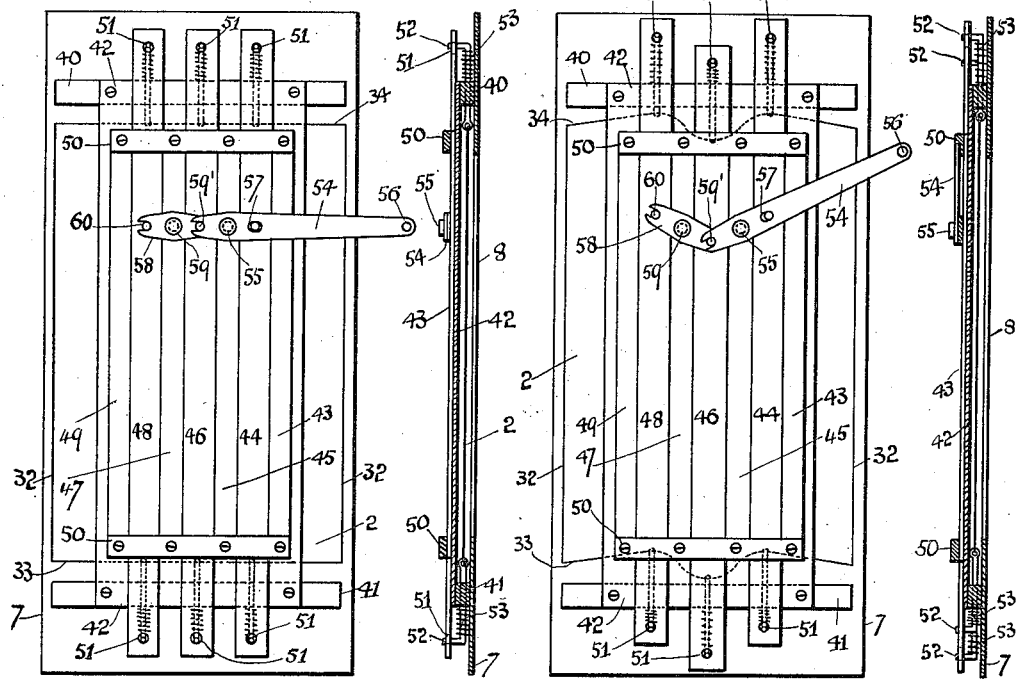
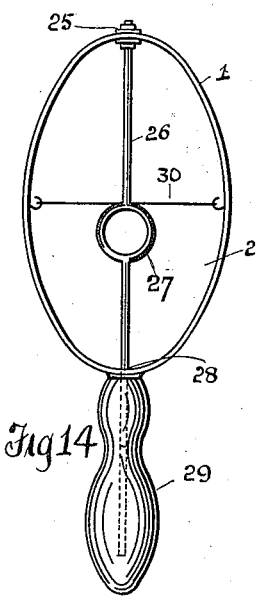
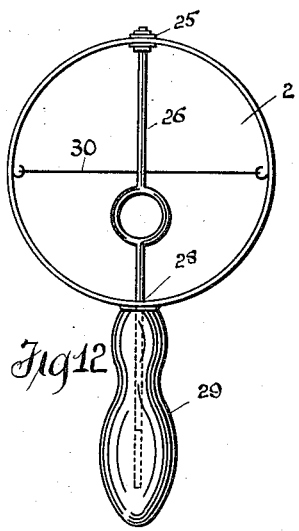
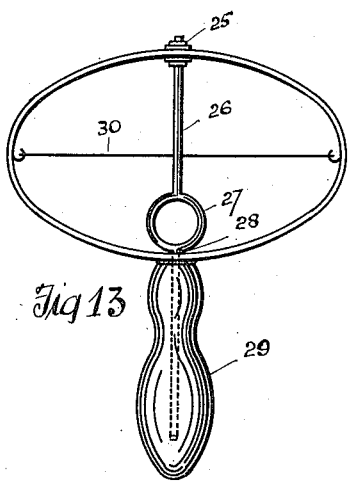
WITNESSES:
John C. Sanders
Albert F. Henman
INVENTOR:
Sidney Charles Martin
BY M. Wallace White
ATTY S. C. MARTIN.
ADVERTISEMENT DEVICE.
APPLICATION FILED JUNE 5, 1914.
1,154,124.
Patented Sept. 21, 1915.
4 SHEETS—SHEET 4.
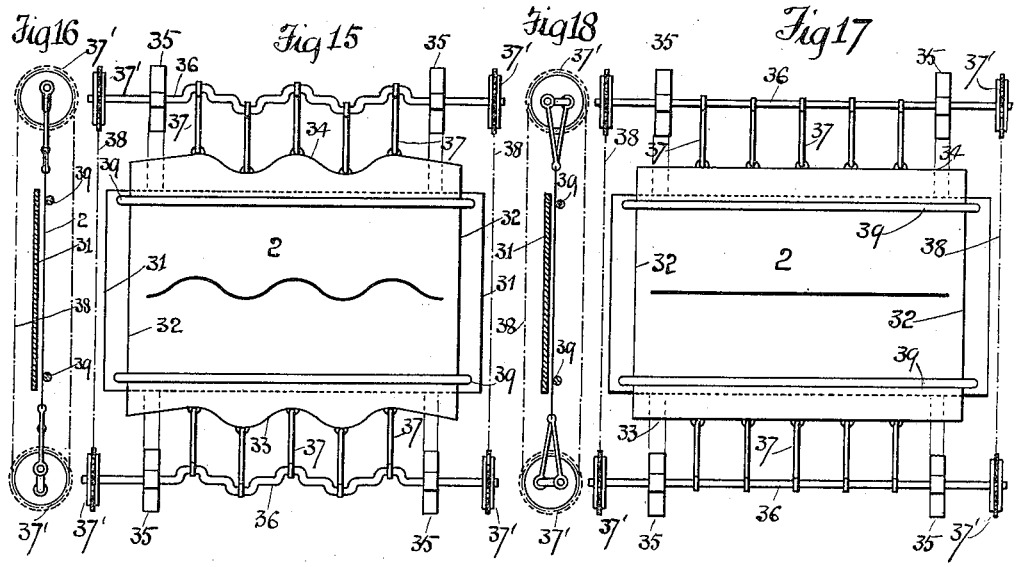
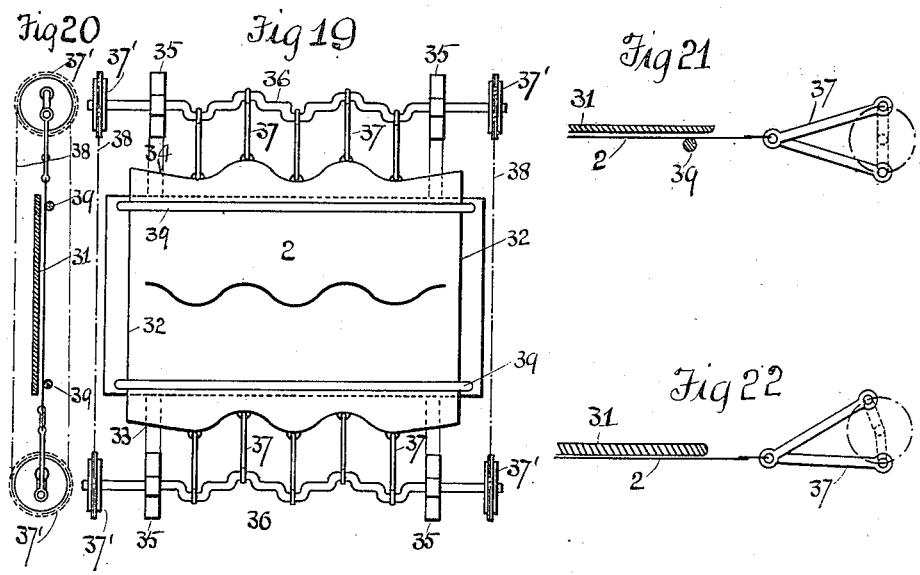
WITNESSES:
John C. Sanders
Albert F. Henman
INVENTOR:
Sidney Charles Martin
BY M. Wallace White
ATTY

UNITED STATES PATENT OFFICE.

SIDNEY CHARLES MARTIN, OF DULWICH VILLAGE, ENGLAND.

ADVERTISEMENT DEVICE.

1,154,124.                    Specification of Letters Patent.    Patented Sept. 21, 1915.

Application filed June 5, 1914.   Serial No. 843,174.

*To all whom it may concern:*

Be it known that I, SIDNEY CHARLES MARTIN, a subject of the King of Great Britain, residing at 121 Turney road, Dulwich Village, in the county of Surrey, England, Great Britain, have invented new and useful Improvements in Advertisement Devices, such improvements being applicable also to other purposes.

My invention relates to an appliance for advertising purposes and which may also be used as a toy and for other purposes and the object thereof is to give motion of a life-like or natural description to the representation of human and other forms which may be depicted by means of painting, printing or the like, in advertisements or other matter.

Now according to this invention, to a ring or hoop formed of any suitable pliable and springy material or to a framing or support which may be of rigid material I secure any suitable textile fabric of an opaque description. The fabric is so laid on to the ring or hoop or framing or support as to be smooth and flat. The fabric so mounted on the ring or hoop or frame or support is capable of being respectively distended and contracted without the surface of the fabric being wrinkled on a pull or push being exerted on the ring or hoop or framing or support at two opposite points thereof out of line with either the weft or warp threads of the fabric. Printed, painted or otherwise directly "figured" on the fabric are the forms or other matter to which it is desired to impart motion. The ring or hoop or framing or support may be embraced in the advertisement or the like in such manner that while the fabric is visible the ring or hoop or framing or support to which such fabric is secured shall not be observable and it is retained in position therein in such way that its free movement shall not be obstructed. The pushing or pulling upon the ring or hoop or framing or support is effected by any suitable and convenient means and such means may be operated by clockwork mechanism by a suitable motor through suitable gearing or connections with the means employed for operating the ring or hoop or framing or support. And in order that my said invention may be fully understood I will proceed to explain the same with reference to the accompanying drawings in which:—

Figure 1 is a front elevation of a ring or hoop with fabric thereon and having on the fabric, by way of example, the representation of a human face, the ring or hoop being in the neutral or normal condition. Fig. 2 is a side elevation of the same. Fig. 3 is a front elevation of the device illustrated by Fig. 1 pulled or pushed out of the normal or neutral condition into the shape shown by Fig. 3. Fig. 4 is a front elevation of the device illustrated by Fig. 1 pulled or pushed out of the normal or neutral condition into the shape shown by Fig. 4. Figs. 5 and 6 are, respectively, back elevation and end views, the latter partly in section, of the ring or hoop in its normal or neutral condition with an example of the means whereby such ring or hoop is moved out of the normal or neutral condition and retained in the advertisement or the like, the fabric sheet being omitted. Figs. 7, 8, 9 and 10 are similar views illustrating the operation of the same means in respectively pushing and pulling the ring or hoop out of the normal or neutral condition. Fig. 11 is a back elevation of an advertisement with the ring or hoop and fabric with a further example of means whereby such ring or hoop may be moved out of the normal or neutral condition. Fig. 12 is a back elevation of the ring or hoop with means for holding in the hand and for moving the ring or hoop out of the normal or neutral condition into the forms shown by Figs. 13 and 14, in each of which the fabric sheet is not shown. Figs. 15 17 and 19 are respectively front elevations of a modified form in which my invention may be carried out, Fig. 17 illustrating the fabric in its normal or neutral condition, and Figs. 15 and 19 illustrating the fabric pulled out of the normal condition. Figs. 16, 18 and 20 are side views respectively of Figs. 15, 17 and 19. Fig. 21 illustrates a detail of Figs. 15, 17 and 19 drawn to a larger scale. Fig. 22 shows a modification of such detail. Fig. 23 illustrates a back view of a modified form in which my invention (as shown by Figs. 15, 16, 17, 18, 19, 20, 21 and 22) may be carried out, the fabric being in its neutral or normal condition. Fig. 24 is a side view—partly in section—of Fig. 23. Fig. 25 is a view similar to Fig. 23 with the fabric moved out of the neutral or normal condition in one direction. Fig. 26 is a side view—partly in section—of the same. Fig. 27 is a front elevation of a frame with fabric, being a modification of the ring or hoop, in a neutral or normal condition. Fig. 28 is a side elevation of the same. Figs. 29 and 30 are, respectively, front elevations of the same frame as shown by Figs. 27 and 28 pushed or pulled out of the normal or neutral condition. Fig. 31 is a front elevation of a frame with fabric, being a modification of the frame as illustrated by Figs. 27, 28, 29 and 30, in a neutral or normal condition. Fig. 32 is a side elevation of the same. Figs. 33 and 34 are, respectively, front elevations of the same frame as shown by Figs. 31 and 32 pushed or pulled out of the normal or neutral condition.

The same reference numerals denote the same parts through all the figures.

1 is the ring or hoop formed of pliable and springy material, such, for instance, as thin hard brass, steel, cane, wood or cardboard, to which is secured by any suitable means (such for instance as an adhesive substance) the textile fabric 2 which fabric may be calico, silk, cambric or the like. The fabric is neatly laid on to the ring or hoop 1 or the frame or support 3 in such way that without being subjected to stretching it shall be perfectly smooth and flat, i. e. without furrows, wrinkles, creases, or otherwise superficially uneven.

I prefer for most purposes to form the ring or hoop 1 or framing or support 3 of an appreciable depth as shown at 1' (Fig. 2) and 3' (Figs. 28 and 32) and thus to have a hoop, ring or framing or support flat and of greater dimensions at its periphery or sides as compared with the cross section of the material from which the ring or hoop or framing or support is composed and to secure the fabric by sticking the edges thereof down to the flat periphery of the ring or hoop 1, or to the sides of the framing or support 3 throughout the whole circumference or sides thereof as the case may be as shown at 2' (Figs. 2, 28 and 32). I have thus a hoop or ring or framing or support entirely closed at the front side thereof by the fabric as shown at 4 and unclosed at the back thereof as shown at 5. The fabric so mounted on the ring or hoop or framing or support is capable of being respectively distended and contracted without the surface of the fabric 2 being wrinkled on a pull or push being exerted on the ring or hoop 1 or framing or support 3 at two or more opposite points thereof out of line with either the weft or warp threads of the fabric 2. Thus on a pull or push being applied to the hoop or ring 1 as shown in Fig. 1 it is pressed out of its normal or neutral shape (depicted in such figure) causing the whole surface of the fabric within the area of the ring or hoop 1 to move or shift from the neutral or normal in accordance with the movement of the hoop or ring. For example, a pull on the ring or hoop at opposite points thereof out of line with either the weft or warp threads of the fabric will bring the ring or hoop 1 and the fabric from the form as shown by Fig. 1 to the shape shown by Fig. 3 while a push or the release of a pull at opposite points will bring the ring back to the form as in Fig. 1 and on the same push or pull as the case may be being continued will bring the ring or hoop 1 into the shape shown by Fig. 4. Similarly in the case of the framing or supports as shown by Figs. 27, 29 and 30, the frame or support as illustrated by Fig. 27 may be pushed or pulled into the shapes shown by Figs. 29 and 30 and so in regard to the frame or support illustrated by Fig. 31 such frame or support may be pushed or pulled into the shape shown by Figs. 33 and 34.

In the case of the employment of frames or supports shown by Figs. 27 to 34, the corners at 6 are preferably provided with suitable hinges or hinging material (not shown) in order to permit of desired movement and to guard against breakage of the frame or support which in these instances may be composed of rigid material.

Printed, painted or otherwise directly figured on the fabric either before or after the fabric is secured to the hoop or ring or framing or support as may be the more convenient are the forms or matter to which it is desired to impart motion as shown by way of example by Figs. 1, 3 and 4. Inasmuch as the fabric will only permit the collapsing or expansion of the ring or hoop or the like when the pull or push is applied out of the line of the warp or weft threads it is essential that the figuring on the fabric be suitably positioned relatively to the direcion of the weft and warp threads of the fabric. The figuring must be arranged with a due regard to the direction of movement to be given to the particular figuring. In the cases illustrated by Figs. 1, 3 and 4, the figuring must be arranged relatively to the weft and warp threads as indicated in such figures. In the cases illustrated by Figs. 27, 29, 30, 31, 33 and 34 the fabric should be mounted on the frame or support with the weft and warp threads in the direction as indicated in such Figs. 27 and 31 relatively to the frame or support. It is also essential that the ring or hoop or framing or support be positioned in the advertisement or the like with a due regard to the direction of movement required of the hoop or ring or framing or support.

In some cases the ring or hoop 1 or the framing or supports 3 may be provided with fabric at both edges or sides thereof in such way as to close such hoop or ring or framing or support at both edges, or, in other words, to entirely inclose the hoop or ring or framing or support by or within the fabric and I may paint or print on such fabric at both sides of the ring or hoop or framing or support so that the matter appearing thereon may be viewed from both such sides. This is merely multiplying the number of sheets of fabric and should not require illustration.

The ring or hoop or framing or support in its main application forms part of advertisements of which a portion (the stationary portion of the advertisement) is cut away the ring or hoop or framing or support being so arranged that the figuring on the fabric secured to the ring or hoop or framing or support is alone visible through the cut away portion it being understood that the "stationary" part of the advertisement has depicted thereon those portions of the advertisement which are not to be animated.

The ring or hoop or framing or support is retained in position in the advertisement in any suitable manner and in all cases in such way that its free movement set up by the exertion of pulls or pushes thereon shall not be obstructed. One method, by way of example, by which the ring or hoop or framing or support may be conveniently mounted in the advertisement and retained in position therein is shown by Figs. 5 to 11. Referring to Figs. 5 to 10, 1 is the ring or hoop having one side only closed by the fabric 2. 7 (Figs. 6, 8 and 10) is the stationary part of the advertisement having portion 8 cut away therefrom and through the aperture formed by so cutting away the fabric portion of the ring or hoop or framing or support is visible. 9. 9. are brackets secured to the stationary part of the advertisement at the back thereof. 10. 10' are rods furnished with eyes 11. 11' which engage with cranks 12. 12' on the shaft 13. The rods 10 and 10' pass freely through perforations 14. 14' formed in the flat part of the ring or hoop and reciprocate freely in perforations 15. 15' in the brackets 9. 76. 16' are abutments fixed rigidly on the rods 10. 10'—one on the inside and one on the outside of the hoop or ring as shown in Figs. 5, 6, 7, 8, 9 and 10, the object of such abutments being to cause the rods to push and pull on to the ring or hoop.

It will be understood that the ring or hoop or the like is retained in position merely by the ends of the rods 10. 10' being supported in the brackets 9, and the hoop or ring or the like just clearing the back of the stationary part of the advertisement.

The shaft 13 is rotated by a suitable motor or other means (not shown) conveniently placed and concealed either in the advertisement structure or in a location adjacent thereto. Figs. 6, 8 and 10 show the position of the cranks 12 and 12' and the rods 10 and 10' to move the hoop or ring into the shapes shown by Figs. 5, 7 and 9 and by Figs. 1, 4 and 3. Fig. 11 shows also by way of example another means whereby the ring or hoop may be retained in position and moved in an advertisement or the like. 7 is the back of the stationary part of the advertisement or the like. 1 is the ring or hoop with its covered part adjacent to the back of the advertisement or the like. 8 is the aperture in the stationary part. 16''. 16''' are ear pieces secured rigidly to the ring or hoop as shown. To the ear piece 16'' is hinged the link 17 (preferably of wood), which link is pivotally secured to the back of the stationary part of the advertisement or the like as shown at 18. Hinged to the ear piece 16''' is the short link 19 fulcrumed at 20 to the back of the advertisement or the like. To the lower end of the link 19 is hinged the link 21 which engages with the pin 22 on the disk crank 23. To the link 17 is hinged at 17' the link 24 such link engaging with the pin 22 on the disk crank 23. The disk 23 is caused to rotate by means of a suitable motor as before referred to. When the disk 23 rotates the ring or hoop is successively moved into the shapes illustrated by Figs. 1, 3, 4 and back again. Two of such movements are indicated in Fig. 11 by full lines and dotted lines.

Figs. 12, 13 and 14 show my ring or hoop adapted to be held in and manipulated by the hand. 1 is the ring or hoop having fabric at one side only and rigidly secured thereto at 25 the rod 26 formed with the ring 27. The free end of the rod 26 passes freely through the periphery of the hoop or ring at 28. 29 is a handle drilled longitudinally to slidingly receive the free end of the rod 26 projecting beyond the periphery of the ring or hoop and to maintain the hoop or ring. 30 is a length of rubber cord or it may be instead a suitable coil spring. In this example the normal or neutral position of the ring or hoop is as illustrated at Fig. 14 the length of the rubber 30 or spring as the case may be being of such length or expansion as normally to keep the ring or hoop in the shape shown at Fig. 14. It is to be understood that the rod 26 carrying the ring 27 and the rubber or spring 30 are within the ring or hoop behind the fabric. The handle 29 being gripped in the hand a finger is inserted in the ring 27 and by exerting gentle pressure on the ring the rod 26 is caused to penetrate lower into the handle when the hoop or ring assumes the shape shown by Fig. 12. On further depressing the rod 26 the ring or hoop is made to assume the shape shown in Fig. 13. On partially relieving the rod 26 of pressure the ring or hoop is caused, by the tension of the spring or rubber 30, to reassume the circular condition as in Fig. 12, and on wholly relieving the rod 26 from pressure the ring or hoop is returned into the neutral or normal condition as shown by Fig. 14.

In the cases of employing a frame or support other than a ring or hoop covered at one side only with fabric the same methods of varying the shape of the frame or support as described in connection with a ring or hoop may be applied. It is obvious that where the ring or hoop or frame or support is covered with fabric on both sides thereof the means whereby the shape of the hoop or the like is varied must be applied externally to the hoop or the like.

Figs. 15, 16, 17, 18, 19 and 20 show a modification of my invention so far specified and the object thereof is to produce a wavy or serpentine movement of the fabric and consequently in the matter depicted thereon. 31 is a frame or foundation plate preferably of wood. The fabric 2 is laid down evenly and smoothly upon the plate or frame. The edges 32 are secured preferably by gluing to the foundation plate or frame while the two other edges 33, 34 are left free. Mounted near each free edge of the fabric in suitable bearings 35 is a multiple crank shaft 36. 37 are links which are reciprocated by the crank shafts 36 and which at one end are secured to the free edges of the fabric.

As will be seen the travel of the two shafts and the throw of the cranks are identical in every respect. On the rotation of the shafts the fabric is pulled on and slackened alternately at the various points of connection with the shafts so that when at one side or end of the fabric a pull at the particular point of connection is being exerted the fabric at the opposite point is being slackened the effect being to produce a serpentine or wavy movement in the fabric and matter painted or otherwise represented thereon. 37' are sprocket wheels rigidly secured to the shafts, and 38 are chains thus to insure uniformity of movement of both shafts. One of the shafts is rotated by a suitable motor.

In order to keep the fabric from being moved away from the flat in one direction by the throw of the cranks I provide smooth rods 39 of any suitable material which rods are secured to the foundation plate or frame 31 such foundation plate or frame preventing movement of the fabric (out of the flat) in the other direction. When the cranks are in the position as shown by Fig. 18 the fabric is in its neutral or normal condition as shown in Fig. 17. When the cranks are in the position as indicated in Fig. 16 the fabric is "waved" as shown in Fig. 15 and when the cranks are in the position shown by Fig. 20 the direction of the "waves" is in the reversed direction as shown by Fig. 19. When the throw of the crank is such as not to so move the links 37 as to carry the fabric away from the flat the rods 39 may be dispensed with as indicated in Fig. 22.

Figs. 23, 24, 25 and 26 show a modification of my invention as described in reference to Figs. 15, 16, 17, 18, 19 and 20. 2 is the fabric secured at its edges 32 to the back of the stationary part 7 of the advertisement or the like, 8 being the open portion of such stationary part or frame through which the fabric and matter thereon may be viewed. Near each free edge 33, 34, I secure to the back of the stationary part or frame 7 two bars 40. 41, preferably of wood, the object thereof being to raise parts hereinafter referred to away and clear of the fabric. I secure to the bars 40. 41. the ends of a piece of flat material 42 which material is preferably wood. I thus bridge over the fabric. On the flat material 42 I arrange a series of bars such as 43. 44. 45. 46. 47. 48. 49—such bars being preferably of wood. Each alternate bar such as 43. 45. 47 and 49 shown in Figs. 23 and 25 is rigidly secured at its ends respectively to the flat material while the intermediate bars such as 44. 46 and 48 are left free to reciprocate between the fixed bars such as 43. 45. 47. 49. In order to retain the reciprocating bars in position I secure to the fixed bars the cross bar 50. As will be obvious I can dispense with the flat material and secure the fixed bars 43. 45. 47 and 49 direct to the bars 40 and 41 and in such case reciprocate the bars 44. 46. 48 over the said bars 40. 41. The reciprocating bars at each of their ends are perforated at 51 such perforations being for the reception of the upturned ends of the wire eyed pieces 52 which are guided in perforations formed in the bars 40 and 41. The fabric is secured to the wire pieces 52 by means of the eyes therein as shown in Figs. 23, 24, 25 and 26. On the wire pieces 52 and interposed between the bars 40. 41 and the upturned ends of such wire pieces are coil springs 53 the object of which is to take up any slackness in the fabric caused by "play" of the wire pieces 52 in the perforations in the bars 44. 46. 48. The reciprocating bars may be operated by the means shown, such means, as will be apparent on reference to the Figs. 23 and 25, consisting of the lever 54 fulcrumed at 55 to one of the stationary bars 45. The lever 54 is provided with the perforation 56 and a slot 57. The perforation 56 is for the purpose of attachment to a connecting rod reciprocated by a suitable motor. The slot 57 receives a pin rigidly inserted in the reciprocating bar 44. Motion is conveyed by the lever 54 to the reciprocating bars 46 and 48 by means of the coacting part 58 which is pivoted at 59 to the stationary bar 47. The part 58 has a slot at each of its ends and the lever 54 has also a slot at its end adjacent to the part 58. A pin 59' is passed through the last-mentioned slot in the lever 54, such pin likewise passing through the slot in the part 58 at that end thereof nearest to the part 54 and rigidly into the reciprocating bar 46. A pin 60 is also rigidly inserted in the reciprocating bar 48 and engages the slot in the other end of the part 58 as shown. In the case of an increased number of reciprocating bars and wire pieces as there may be the part 58 may be repeated and such parts brought into engagement with each other and applied to the bars as herein appears and as will be clearly understood.

When the lever 54 is in the position shown by Fig. 23 the fabric is in its normal or neutral condition, there being no pull on such fabric but when the lever is moved to the position shown in Fig. 25 it will be seen that the reciprocating bars 44 and 48 are moved in one direction while the reciprocating bar 46 is moved in the reverse direction the movement of such bars being in the reverse direction when the lever is swung to a similar position in the reverse direction with the result that on the continued rocking of the lever 54 the fabric being pulled on and slackened at opposite points a wavy or serpentine movement in the fabric and the matter represented thereon is effected.

In the modified form of my invention as shown in Figs. 15 to 20 and in Figs. 23 to 26 the pull may be in the direction of either warp or weft threads of the fabric.

I desire it to be clearly understood that in having herein referred to means whereby change in the surface of the fabric and in the matter depicted thereon may be effected I have done so by way of example only as many varied means may be employed. I, therefore, in no sense restrict myself to the methods or means herein mentioned.

I claim:

1. In a display device of the class described, a flexible rim, and a sheet bearing a surface design stretched across and closing the rim, the rim and the sheet being flexible in a direction parallel to the plane of the sheet.

2. In a display device of the class described, a flexible rim. a sheet of fabric bearing a surface design, stretched across and closing the rim, the rim being flexible in a direction parallel to the plane of the sheet.

3. A display device comprising a flexible rim, a sheet of flexible material, bearing a surface design, stretched across and closing the rim, and means for flexing the sides of the rim in a direction parallel to the plane of the sheet.

4. A display device comprising a rim having relatively movable sides, a sheet of fabric stretched across and closing the latter, the rim being capable of elongation in a direction parallel to the plane of the sheet and at an oblique angle to the threads of the fabric.

5. A display device of the class described comprising a flexible rim, a sheet of flexible material, bearing a surface design, stretched across and closing the rim, an operating member, and connecting rods connecting the operating member with opposite sides of the rim to cause the latter to be flexed in a direction parallel to the plane of the sheet upon actuation of the said member.

6. A display device of the class described, comprising a flexible rim, a sheet of flexible material, bearing a surface design, stretched across and closing the rim, a rotary operating member, and means connecting the said member with the opposite sides of the rim for flexing the latter in a direction parallel to the plane of the sheet upon actuation of the said member.

7. A display device of the class described, comprising a flexible rim, a sheet of flexible material, bearing a surface design, stretched across and closing the rim, an operating member in the form of a crank, and connecting rods extending between the crank and the opposite sides of the rim for flexing the latter in a direction parallel to the plane of the sheet upon actuation of the crank.

8. In a display device of the class described, a flexible resilient rim, and a sheet bearing a surface design stretched across and closing the rim, the rim and the sheet both being flexible in a direction parallel to the plane of the sheet, the rim being adapted normally to assume a form such that the sheet will not be distorted.

9. In a display device of the class described, a flexible resilient rim, a sheet bearing a surface design stretched across and closing the rim, and means by which the rim may be flexed in a direction parallel to the plane of the sheet, the rim being adapted normally to assume a form such that the sheet will not be distorted.

10. A display device of the class described comprising a sheet of flexible material bearing a surface design, and means connected with opposite edges of the sheet for flexing the latter in a direction parallel to the plane of the same.

11. A display device of the class described comprising a sheet of flexible material, an operating member, and means connecting the said member with opposite edges of the sheet for flexing the latter in a direction parallel to the plane of the same upon movement of the operating member.

12. A display device of the class described comprising a sheet of flexible material, an operating member in the form of a crank, and connecting rods associated with the crank and connected with the opposite edges of the sheet for flexing the latter in a direction parallel to the plane of the same upon actuation of the crank.

SIDNEY CHARLES MARTIN.

Witnesses:
H. C. FOWLER,
B. H. FOWLER.

Copies of this patent may be obtained for five cents each, by addressing the "Commissioner of Patents, Washington, D. C."